C. A. PRATT.
RACK RAIL LOCOMOTIVE SYSTEM.
APPLICATION FILED JAN. 2, 1907. RENEWED AUG. 19, 1907.
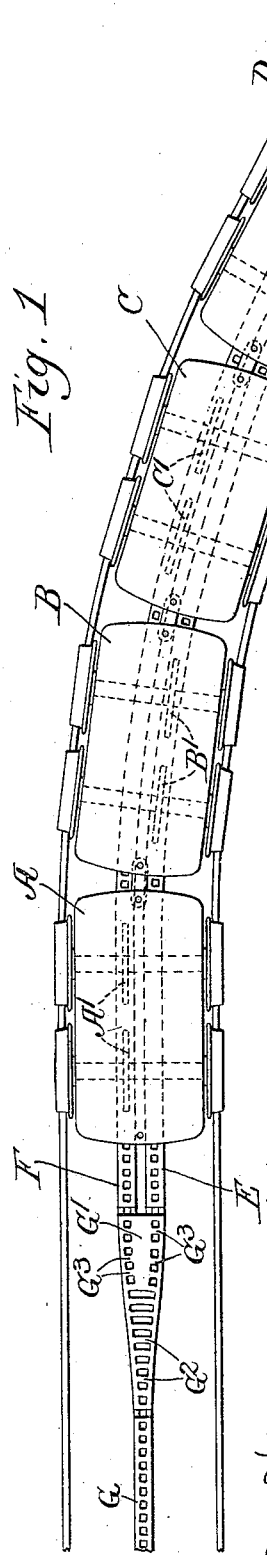
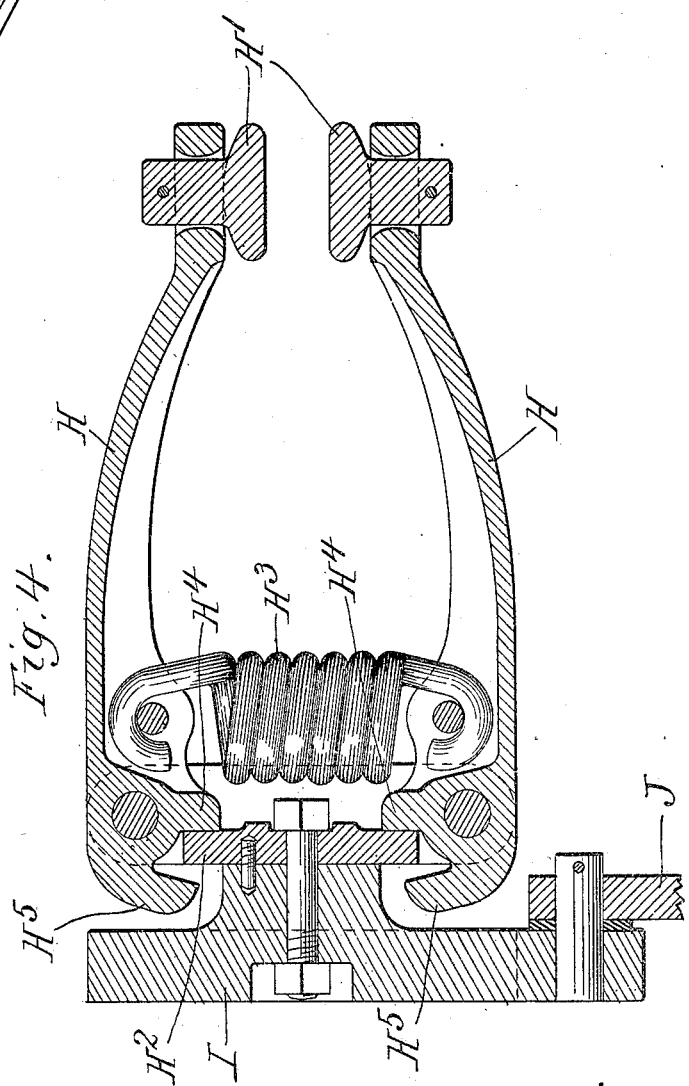

C. A. PRATT.
RACK RAIL LOCOMOTIVE SYSTEM.
APPLICATION FILED JAN. 2, 1907. RENEWED AUG. 19, 1907.

951,842.

Patented Mar. 15, 1910.

2 SHEETS—SHEET 2.

Witnesses,
Edward T. Wray.
J. S. Abbott

Inventor.
Charles A. Pratt
by Parker & Carter
Attorneys.

UNITED STATES PATENT OFFICE.

CHARLES A. PRATT, OF CHICAGO, ILLINOIS, ASSIGNOR TO GOODMAN MANUFACTURING COMPANY, OF CHICAGO, ILLINOIS, A CORPORATION OF ILLINOIS.

RACK-RAIL LOCOMOTIVE SYSTEM.

951,842.  Specification of Letters Patent.  Patented Mar. 15, 1910.

Application filed January 2, 1907, Serial No. 350,514. Renewed August 19, 1907. Serial No. 389,252.

*To all whom it may concern:*

Be it known that I, CHARLES A. PRATT, a citizen of the United States, residing at Chicago, in the county of Cook and State of Illinois, have invented a certain new and useful Improvement in Rack-Rail Locomotive Systems, of which the following is a specification.

This invention relates to a rack rail locomotive system, and has for its object to provide a new and improved system of this description.

Figure 3:
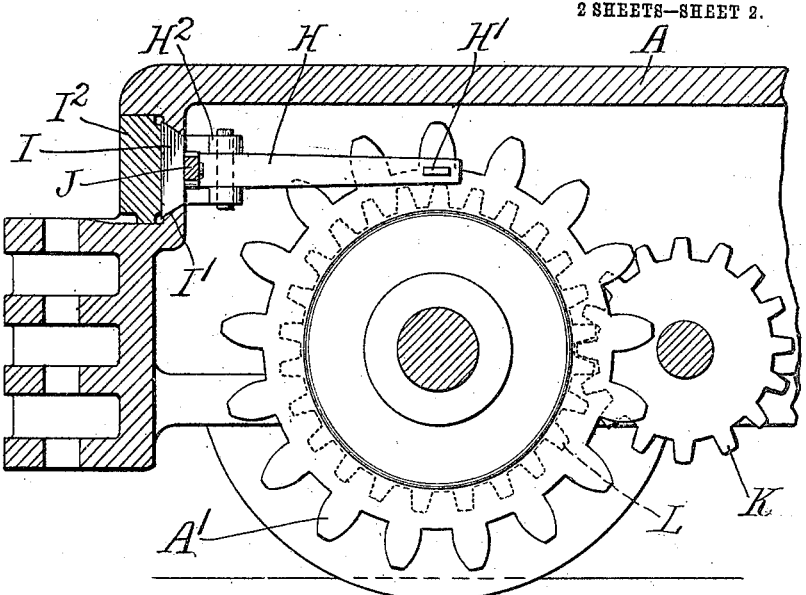
Figure 2:
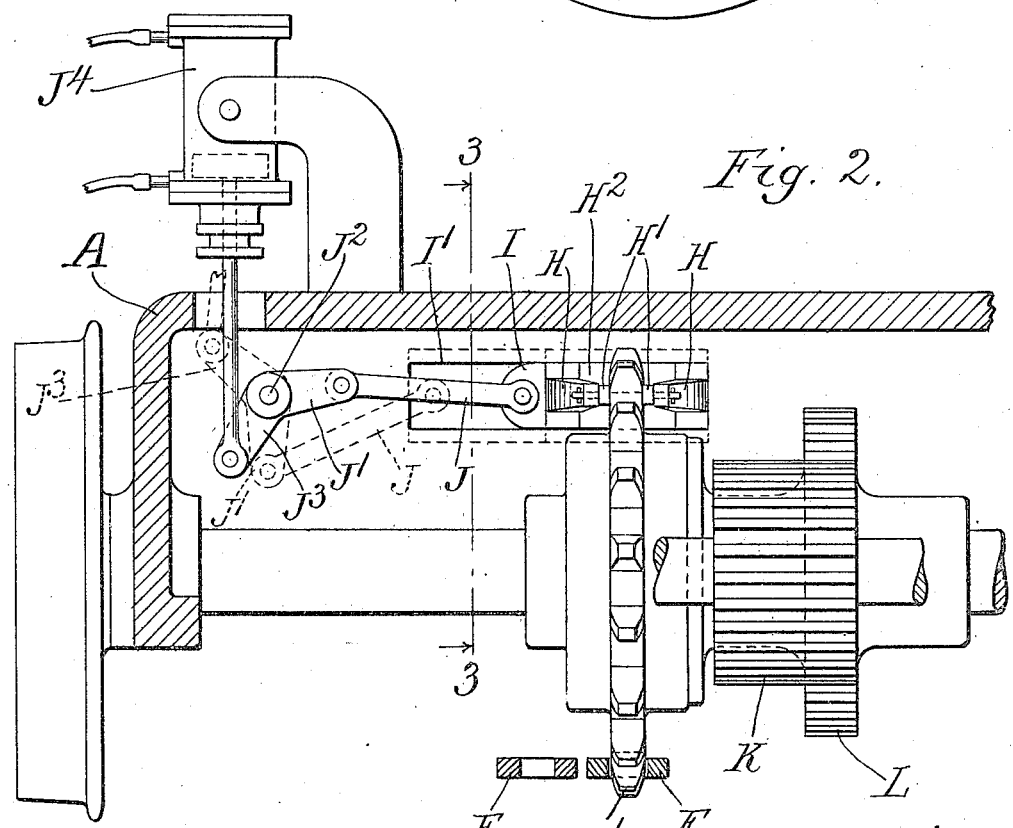

Referring to the accompanying drawings, wherein the invention is illustrated, Figure 1 is a plan view with parts omitted showing an apparatus embodying this invention; Fig. 2 is a sectional view with parts omitted showing one form of sprocket wheel controlling apparatus; Fig. 3 is a sectional view taken on line 3—3 of Fig. 2; Fig. 4 is a view of one form of sprocket wheel engaging device.

Like letters refer to like parts throughout the several figures.

In the operation of rack rail locomotives an ordinary standard rack rail is used, and one or more rack rail locomotives are run along the track, the sprocket wheels on the locomotives engaging the rack. The pressure that can be put upon this rack is of course limited by the tensile strength of the rack, and the strength of the means for holding it to the road bed, and if several locomotives are hitched together and connected by their sprocket wheels to the same rack the force exerted upon the rack is too great and either results in the breaking of the rack or its displacement from its moorings. This strain upon the rack is of course greater when the grade is heavy.

Referring now to the drawings there is shown in Fig. 1 a series of locomotives A, B, C, D. These locomotives may be of any desired description, and are provided with sprocket wheels $A^1$, $B^1$, $C^1$ and $D^1$. The locomotives run upon any ordinary track, and there are provided a plurality of rack rails. In the drawings there are shown two such rack rails E and F. These rack rails may be of the ordinary standard construction provided with teeth separated by spaces so as to be engaged by the sprocket wheels on the locomotives. The sprocket wheels on some of the locomotives engage the rack rail E and the sprocket wheels on others engage the rack rail F. The arrangement of these sprocket wheels will depend upon the conditions presented. For example the first locomotive may have its sprocket wheels engaging one rack rail, and the next the other rack rail, the third the first rack rail, etc. Or the sprocket wheels of the first few locomotives may engage one rack rail, and the sprocket wheels of the remaining locomotives the other rack rail. In other words any desired distribution of the locomotives between this plurality of rails may be provided, it being always a provision that the distribution is such as to prevent too great a strain upon the rail.

The entire length of track may be provided with the plurality of rack rails, or they may only be used at the heavy grades, such rack rails uniting or combining into a single rack G. It is of course evident that any desired number of rack rails can be used. In view, however, of the fact that on curves the outer rack rail would be longer than the inner, this plurality of rack rails could not be practically used on a single locomotive by simply enlarging the locomotive, and it is therefore necessary to split the motive power up into several units, as herein suggested, in which event this difficulty is obviated. The sprocket wheels on the locomotive are preferably arranged so as to be movable laterally in order that they may be shifted from one rack rail to the other, or be brought in position so as to engage with the single rack rail when the plurality of rack rails unite. As the sprocket wheels are simply loose upon the axle or shaft upon which they are mounted, this result can be secured. It is however desirable to provide some positive means of shifting the sprocket wheels. Any desired arrangement for this purpose can be used. I have illustrated one form of this device in Figs. 2, 3 and 4. Associated with the sprocket wheel is a sprocket-wheel-engaging device provided with two elastically held arms H, preferably provided with removable shoes $H^1$ which engage the face of the sprocket wheel. The arms H are movably connected to a support $H^2$. The arms H are elastically held in contact with the sprocket wheel in any desired manner, as, for example, by means of spring $H^3$. Said arms are provided with limiting devices $H^4$ which limit the movement in one direction, and $H^5$ which limit the movement in the other direction. The function of the elastic contact with the sprocket wheel is to permit it to move laterally to compensate for inequalities in the rack rail. The sprocket-wheel-engaging device is movably mounted on the frame in any desired manner. As herein shown the base $H^2$ is connected to a movable holding part I which works in a groove or guide $I^1$ in the frame; the holding part I, as shown for example in Fig. 2, is beveled and engages beveled faces on the frame. A removable piece $I^2$ is provided in the frame by means of which it can be placed in position, and will be held in position when the removable piece $I^2$ is in place. Some means is provided for moving the holding part I so as to move the sprocket wheel from one rack rail to the other. As herein shown, a rod J is connected with said holding part I, and with an arm or crank $J^1$ on a shaft $J^2$. This shaft is provided with another arm or crank $J^3$ which is connected to a piston in the cylinder $J^4$. This cylinder is arranged so that some actuating fluid as air or the like can be used to move the piston, and thus move the sprocket-wheel-engaging device. By means of these air cylinders a series of the sprocket wheels can be moved at one time. The sprocket wheels are driven by the gears K and L, the gear L being connected with the sprocket wheels so as to move therewith, and the gear K with the motor. One of these gears is preferably provided with a wide engaging face so that the other gear may be in engagement therewith during all the various positions of the sprocket wheel.

When it is desired to change from a plurality of rack rails to one rack rail, for example, and vice versa, the change is preferably made by a frog $G^1$. This frog is arranged with a series of teeth $G^2$ which gradually increase in length from the single rack rail toward the plurality of rack rails for a portion of the length of the frog, the remaining portion being provided with several series of teeth $G^3$ which gradually spread so as to be in line with the teeth on the different rack rails with which it connects. By this means the sprocket wheels on the locomotives may be changed from the plurality of racks to a single rack, and from the single rack to any one of the plurality of racks. It will further be seen that there is provided means for bringing the various sprocket wheels into engagement with a single rack rail at points where a single rack rail can properly be used and for dividing said sprocket wheels between the several rack rails when it is desired to distribute the power between them. This construction is very desirable under conditions where, for example, the grade varies in steepness to a considerable extent. Under such conditions it is desirable to have a plurality of rack rails at one or more points and a single rack rail at one or more other points in the system. The power device is adapted to engage both the single and the plural rack rails as it travels along the track. As herein shown, the power devices are provided with movable sprockets and guiding mechanism for the sprockets comprising a resilient member and a centralizing device consisting of a stop or stops for such resilient member.

I claim:

1. A rack rail locomotive system comprising a plurality of rack rails, a power device having a series of sprocket wheels adapted to engage said rack rails, and means for distributing said sprocket wheels between said rack rails so that the load is divided between them.

2. A rack rail locomotive system comprising a plurality of rack rails, a power device having a series of sprocket wheels adapted to engage said rack rails, and means for distributing said sprocket wheels between said rack rails so that the load is divided between them, said sprocket wheels adapted to be moved from one rack rail to the other.

3. A rack rail locomotive system comprising a plurality of rack rails, a series of separate power units each provided with a sprocket wheel, some of said sprocket wheels engaging one rack rail, and some another.

4. A rack rail locomotive system comprising a plurality of rack rails, a plurality of power units each provided with a sprocket wheel adapted to engage said rack rails, said sprocket wheels distributed between said rack rails, an engaging device for engaging each of said sprocket wheels, and means for moving said engaging device so as to move the sprocket wheels to bring them into engagement with any one of said rack rails.

5. A rack rail locomotive system comprising a series of rack rails, a power device, a series of sprocket wheels associated with said power device by means of which connection is made to said rack rails, a shaft for each of said sprocket wheels, sprocket wheels mounted on said shaft so as to be free to move longitudinally therealong, and means for moving said sprocket wheels so as to bring them into position to engage either of said rack rails.

6. The combination with a sprocket wheel of an engaging device therefor comprising two rigid arms, one on each side of said sprocket wheel, means for elastically pressing said arms toward the sprocket wheel, and a base with which said arms are associated, said base adjustable with relation to said sprocket wheel.

7. The combination with a sprocket wheel of an engaging device therefor comprising two arms, one on each side of said sprocket wheel, means for elastically pressing said arms toward the sprocket wheel, a base with which said arms are associated, and means independent of said sprocket wheel for limiting the movement of said arms in either direction with relation to said base.

8. A rack rail locomotive system comprising a plurality of rack rails, a plurality of power units each provided with a sprocket wheel, said sprocket wheels arranged so that some engage one rack rail and some another, an engaging device associated with each sprocket wheel comprising two arms, one on each side of the sprocket wheel, means for elastically forcing said arms toward the sprocket wheel, a base with which said arms are connected, and means for moving said base so as to shift the position of said arms.

9. A rack rail system comprising a plurality of rack rails, a power device engaging said rack rails, and means for distributing between said rack rails the pressure developed by the power device.

10. A rack rail system comprising a plurality of rack rails, a plurality of independent power devices engaging said rack rails, and means for distributing between said rack rails the pressure developed by the power device.

11. In a rack rail system, a plurality of rack rails at a point therein, and a single rack rail at another point in the system, a plurality of power devices adapted to engage both the single and the plural rack rails.

12. In a rack rail system, a plurality of rack rails at a point therein and a single rack rail at another point in the system, power devices adapted to move along said rack rails, sprocket wheels associated with said power devices and adapted to engage the rack rails, a centralizing guiding mechanism for the sprocket wheels, and means for actuating said mechanism for the purpose of directing the engagement of the sprocket wheels with one or the other of the rack rails.

13. The combination with a laterally movable sprocket wheel of a guiding mechanism for the sprocket wheel comprising a resilient member and centralizing stops independent of said sprocket wheel which limit the movement of said mechanism both toward and away from said sprocket wheel.

CHARLES A. PRATT.

Witnesses:
 DONALD M. CARTER,
 EDWARD T. WRAY.